United States Patent
Hwang et al.

(10) Patent No.: US 10,019,072 B2
(45) Date of Patent: Jul. 10, 2018

(54) IMAGINED GRID FINGERTIP INPUT EDITOR ON WEARABLE DEVICE

(71) Applicant: International Business Machines Corporation, Armonk, NY (US)

(72) Inventors: Inseok Hwang, Austin, TX (US); Su Liu, Austin, TX (US); Cheng Xu, Beijing (CN); Quan W. Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 14/986,641

(22) Filed: Jan. 1, 2016

(65) Prior Publication Data

US 2017/0192525 A1    Jul. 6, 2017

(51) Int. Cl.
*G06F 3/01* (2006.01)
*G06F 3/0488* (2013.01)
*G06F 3/0482* (2013.01)

(52) U.S. Cl.
CPC ........... *G06F 3/018* (2013.01); *G06F 3/0482* (2013.01); *G06F 3/04883* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 6,304,840 B1* | 10/2001 | Vance | G06F 3/014 703/21 |
| 6,765,556 B2 | 7/2004 | Kandogan et al. | |
| 8,514,251 B2 | 8/2013 | Hildreth et al. | |
| 8,788,977 B2 | 7/2014 | Bezos | |
| 8,897,491 B2 | 11/2014 | Ambrus et al. | |
| 8,929,609 B2 | 1/2015 | Padovani et al. | |
| 8,929,612 B2 | 1/2015 | Ambrus et al. | |
| 2005/0009584 A1* | 1/2005 | Park | H04B 1/385 455/575.6 |
| 2012/0165096 A1 | 6/2012 | Geisner et al. | |
| 2012/0319940 A1 | 12/2012 | Bress et al. | |

(Continued)

FOREIGN PATENT DOCUMENTS

| | | |
|---|---|---|
| CN | 104750266 | 7/2015 |
| WO | 2014210502 | 12/2014 |

OTHER PUBLICATIONS

"Apple confirmed squared input method is the Hong Kong Bank State Bank iOS 7 device-specific functions," TechWeb.com.cn, Oct. 2013, 4 pages.

(Continued)

*Primary Examiner* — Nicholas Lee
(74) *Attorney, Agent, or Firm* — VanLeeuwen & VanLeeuwen; Steven L. Bennett (57) ABSTRACT

An approach is provided in which an information handling system detects fingertip movements of a user based on an imaginary grid imagined by the user. The information handling system determines a key entry or control request based upon matching the fingertip movements to fingertip movement patterns corresponding to the imaginary grid. In turn, the information handling system displays characters on a wearable computing device or performs actions based on the control requests.

18 Claims, 7 Drawing Sheets

(56) References Cited

U.S. PATENT DOCUMENTS

| | | | |
|---|---|---|---|
| 2013/0113709 A1* | 5/2013 | Wine | G06F 1/163 |
| | | | 345/169 |
| 2013/0113714 A1 | 5/2013 | Mao | |
| 2014/0055343 A1 | 2/2014 | Kim | |
| 2014/0380223 A1 | 12/2014 | Counsell et al. | |
| 2015/0002391 A1 | 1/2015 | Chen | |
| 2015/0015504 A1 | 1/2015 | Lee et al. | |

OTHER PUBLICATIONS

Moore, "Engineers test sign language on cell phones," CNET, Aug. 2010, 3 pages.

"Gesture Recognition: The Next Big Thing for Smartphones after Touch?" PointGrab Ltd., Jan. 2013, 3 pages.

Yang, "Jiugongge basic compliance iOS7 Beta4 input method experience," Bubble Network Mobile Channel, Jul. 2013, 11 page.

Kolsch et al., "Keyboards with Keyboards: A Survey of Virtual Keyboards," UCSB Technical Report 2002-21, Jul. 2002, 8 pages.

Stein, "Leap Motion Controller Review," CNET Magazine, Jul. 2013, 8 pages.

Searl, "Top 18 Gesture Recognition Technology Companies," technavio, Feb. 2014, 6 pages.

Lyons et al., "Twiddler Typing: One-Handed Chording Text Entry for Mobile Phones," Proceedings of the SIGCHI conference on Human factors in Computing Systems, Apr. 2004, Vienna, Austria, 8 pages.

* cited by examiner

Movement Conversion Table 345

| Fingertip Movement Patterns 405 | | | | Key Entry/ IME Select/ Mode Select |
|---|---|---|---|---|
| Thumb | Index Finger | Middle Finger | Ring Finger | |
| | | Point/Up/Left | | A |
| | | Point/Up | | B |
| | | Point/Up/Right | | C |
| | | | Point/Up/Left | D |
| | | | Point/Up | E |
| | | | Point/Up/Right | F |
| | Point/Left | | | G |
| | Point | | | H |
| | Point/Right | | | I |
| | | Point/Left | | J |
| | | Point | | K |
| | | Point/Right | | L |
| | | | Point/Left | M |
| | | | Point | N |
| | | | Point/Right | O |
| | Point/Down/Left | | | P |
| | Point/Down | | | Q |
| | Point/Down/Right | | | R |
| | Point/Down/Right/Down | | | S |
| | | Point/Down/Left | | T |
| | | Point/Down | | U |
| | | Point/Down/Right | | V |
| | | | Point/Down/Left | W |
| | | | Point/Down | X |
| | | | Point/Down/Right | Y |
| | | | Point/Down/Right/Down | Z |
| Point | | | | Switch IME |
| Point/Left/Up | | | | Upper Case |
| Point/Left/Down | | | | Lower Case |
| Point/Right | | | | Digit Input |

Brackets: 415 (A–C), 420 (D–F), 430 (G–I), 440 (J–L), 450 (M–O), 460 (P–S), 470 (T–V), 480 (W–Z), 490 (Switch IME–Digit Input); 410 points to Key Entry/IME Select/Mode Select column.

IMAGINED GRID FINGERTIP INPUT EDITOR ON WEARABLE DEVICE

BACKGROUND

The present disclosure relates to an imagined grid fingertip input method editor on a wearable device that converts fingertip movements into character entries based upon an imaginary grid that is imagined by a user.

Wearable devices, also known as body-borne computers or wearables, are miniature electronic devices that are worn by a user under, with, or on top of clothing. Inputting information into these wearable devices is a complex task because wearable computers typically do not utilize traditional input devices such as keyboards or touch screens. Wearable devices, as well as traditional computing devices, may use an input method editor (IME) that receives data and converts the data based on the IME. For example, a traditional computer system may use an IME to allow a user to input Chinese, Japanese, Korean or Indic characters through a Latin keyboard (e.g., a traditional 101-key English keyboard). In addition, hand-held devices, such as mobile phones, use IME's to enable a user to use a numeric keypad to enter Latin alphabet characters (or any other alphabet characters).

BRIEF SUMMARY

According to one embodiment of the present disclosure, an approach is provided in which an information handling system detects fingertip movements of a user based on an imaginary grid imagined by the user. The information handling system determines a key entry or control request based upon matching the fingertip movements to fingertip movement patterns corresponding to the imaginary grid. In turn, the information handling system displays characters on a wearable computing device or performs actions based on the control requests.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIGS. 1 through 6 depict a wearable system that senses a user's fingertip movements and converts the fingertip movements to characters that are displayed on a display. The wearable system does not require a physical or virtual input device, such as a keyboard or mouse. Instead, the user imagines a grid, such as a JiuGongGe 3×3 grid (imaginary grid 140), and moves fingers based on the imaginary grid. The user may switch modes (upper case, lower case, digital mode) as well as input method editors (IMEs) such as Latin, Pin Yin/Chinese, Romani/Japanese, or other types of Romanized phonetic-based input systems using a designated finger or thumb.

Figure 1:
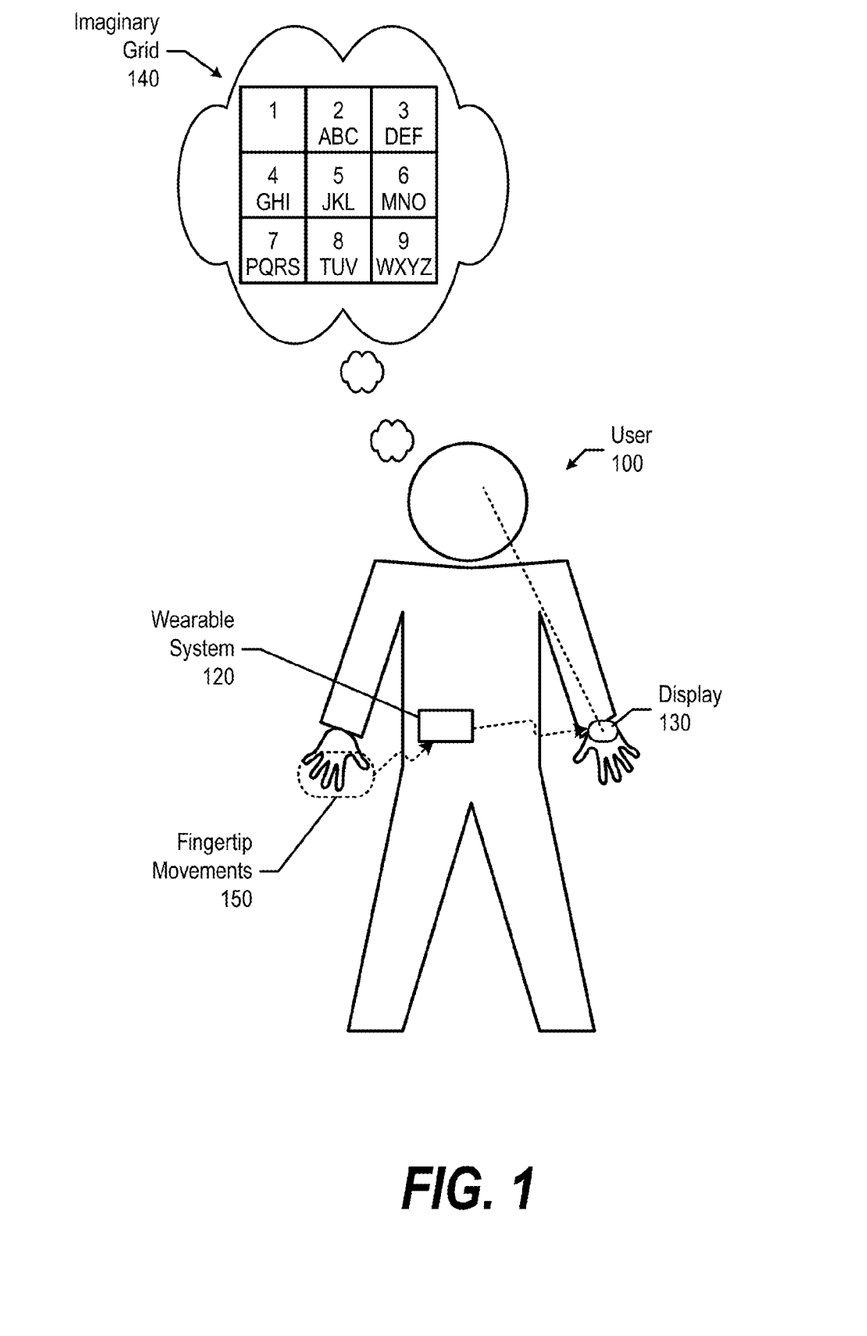
FIG. 1 is an exemplary diagram depicting a wearable system detecting fingertip movements formed by a user based on an imaginary grid and converting the fingertip movements to characters that are displayed on a display.

FIG. 1 is an exemplary diagram depicting a wearable system detecting fingertip movements formed by a user based on an imaginary grid and converting the fingertip movements to characters that are displayed on a display. User 100 wears wearable system 120, which converts fingertip movements 150 into characters that are displayed on display 130 (see FIG. 2 and corresponding text for further details).

User 100 imagines imagery grid 140 to determine which fingertip movements to perform. Specifically, imaginary grid 140 only exists in the user's mind and is not a physical device or virtual device. As such, user 100 may be moving or standing and still enter information using fingertip movements 150. In one embodiment, imaginary grid 140 is a (JiuGongGe) JGG 3×3 grid such as that shown in FIG. 1. JGG is widely accepted in Eastern Asia and other areas in the world and, as such, does not entail a substantial learning curve for a user.

Figure 2:
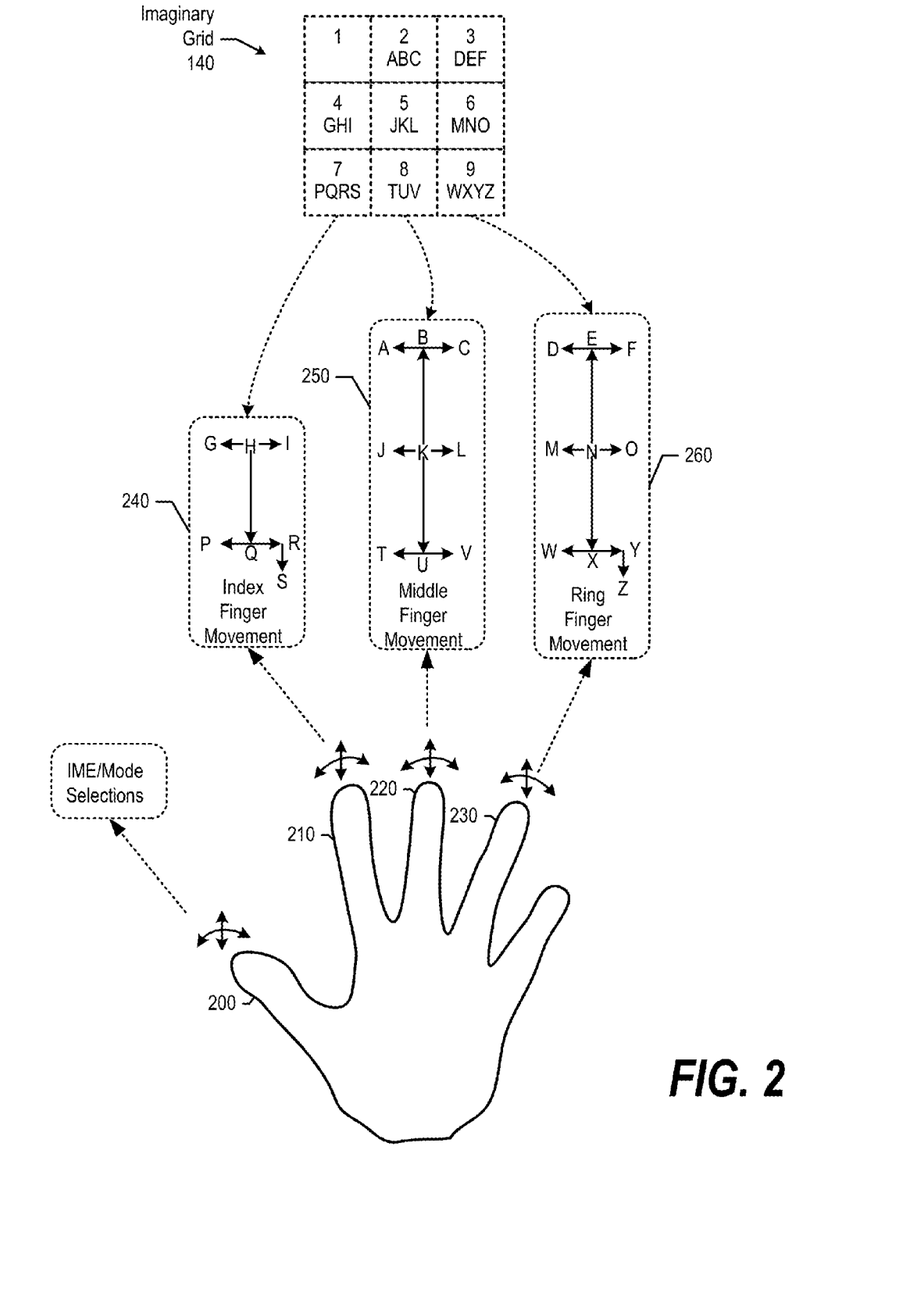
FIG. 2 is an exemplary diagram depicting fingertip movements associated with an imaginary grid.

FIG. 2 is an exemplary diagram depicting fingertip movements associated with an imaginary grid. User 100 imagines imaginary grid 140 and moves fingers 210, 220, and 230 to select various characters on imaginary grid 140. As those skilled in the art can appreciate, a user may configure wearable system 120 such that different hands, different fingers, and different fingertip movements may be mapped to characters in a different manner than what is shown in FIG. 2.

FIG. 2 shows that user 100 moves the user's index finger 210 according to patterns 240, which is based on imaginary grid 140, to select the following characters:

H: Point;
G: Point, move left;
I: Point, move right;
Q: Point, move down;
P: Point, move down, move left;
R: Point, move down, move right; and
S: Point, move down, move right, move down.

Similarly, FIG. 2 shows that user 100 moves the user's middle finger 220 according to patterns 250 (based on imaginary grid 140) to select the following characters:

K: Point;
J: Point, move left;
L: Point, move right;
B: Point, move up;
A: Point, move up, move left;
C: Point, move up, move right;
U: Point, move down;
T: Point, move down, move left;
V: Point, move down, move right.

And, FIG. 2 shows that user 100 moves the user's ring finger 230 according to patterns 260 (based on imaginary grid 140) to select the following characters:

N: Point;
M: Point, move left;
O: Point, move right;
E: Point, move up;
D: Point, move up, move left;
F: Point, move up, move right;
X: Point, move down;
W: Point, move down, move left;
Y: Point, move down, move right; and
Z: Point, move down, move right, move down.

In one embodiment, user 100 may move the user's thumb 200, or other fingers, to switch modes (upper/lower case, digit mode, etc.) or switch to a different IME, such as to a Pinyin IME or Romaji IME (see FIGS. 3-5, 7 and corresponding text for further details).

Figure 3:
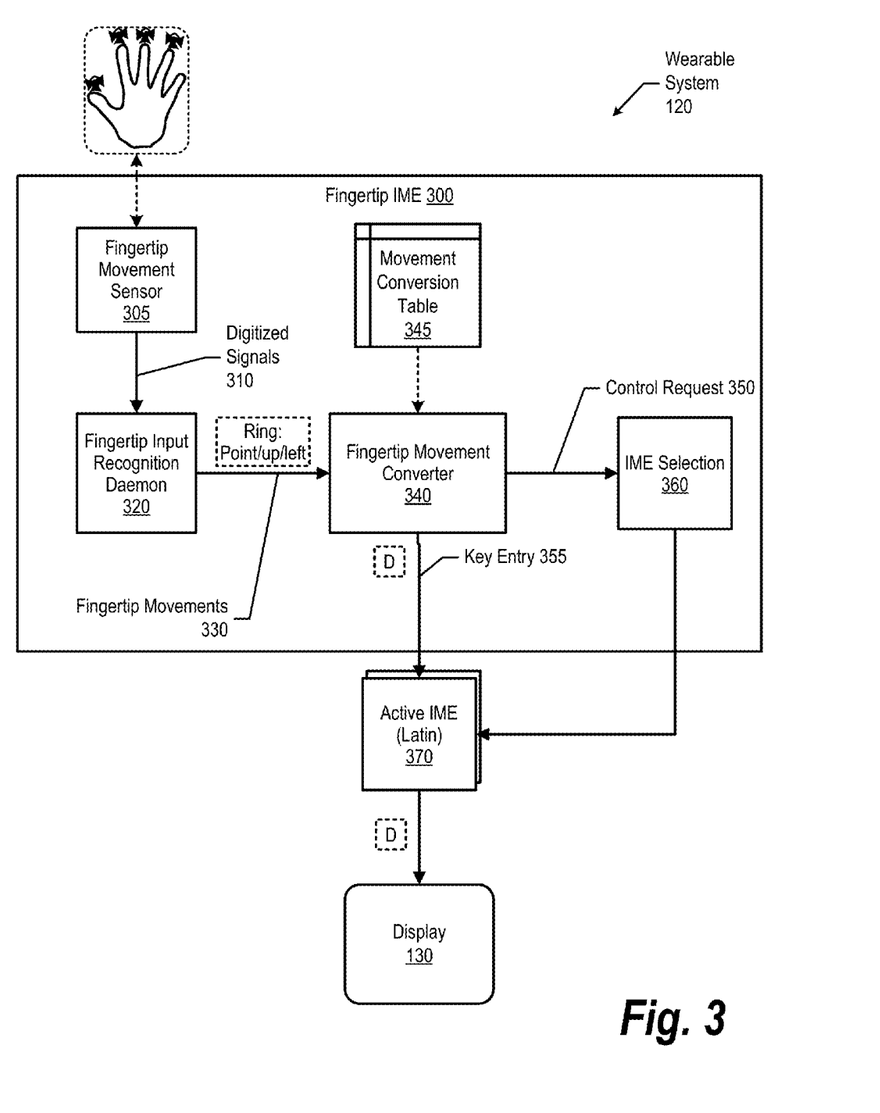
FIG. 3 is a high level diagram showing a wearable system that converts fingertip movements to information that is understandable by a computing system.

FIG. 3 is a high level diagram showing a wearable system that converts fingertip movements to information that is understandable by a computing system. Wearable system 120 includes fingertip IME 300, which uses various components to detect fingertip movements and convert the fingertip movements to characters and control requests. In one embodiment, fingertip IME 300 may be an IME wrapper or IME shell of Romanized phonetic-based IME's included in wearable system 120.

Fingertip movement sensor 305 monitors user 100's fingertip movements and converts the fingertip movements to digitized signals 310. In one embodiment, fingertip movement sensor 305 may use infrared technology, optical technology, wired technology, etc. to detect fingertip movement. In another embodiment, user 100 may wear a digitized glove with receptors detected by fingertip movement sensor 305.

Fingertip input recognition daemon 320 analyzes digitized signals 310 and determines which finger/thumb moved and in which pattern. The example in FIG. 3 shows that fingertip input recognition daemon 320 determined that the user's ring finger pointed, moved up, and to the left. In one embodiment, fingertip input recognition daemon 320 may be trained by user 100 to detect user 100's fingertip movements. For example, user 100 may be a person with long fingers and may train fingertip input recognition daemon 320 to the person's upper and lower fingertip movement extremes, which would be different than a person with short fingers.

Figure 4:
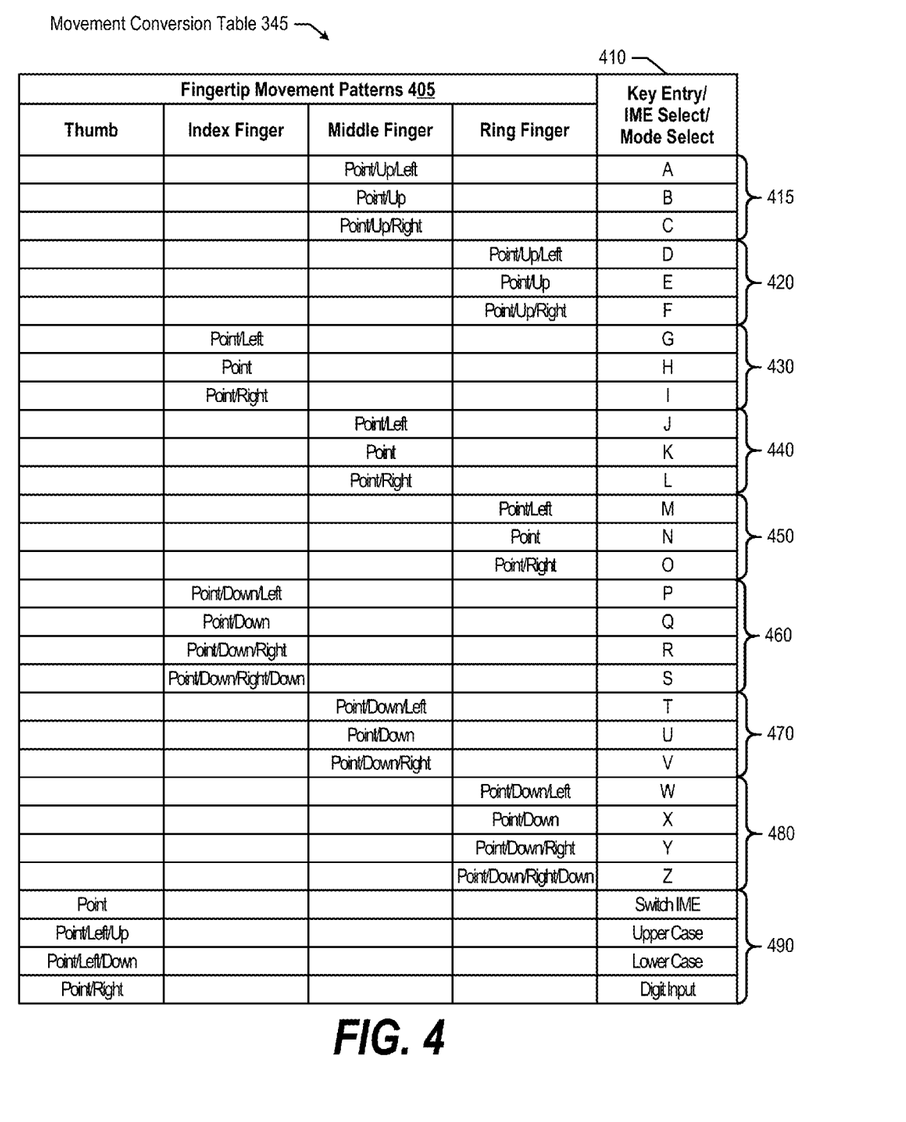
FIG. 4 is an exemplary diagram depicting a table that maps fingertip movements to particular key entries or control requests.

Fingertip movement converter 340 receives fingertip movements 330 and uses movement conversion table 345 to convert fingertip movements 330 to key entries 355 (alphabet characters, numbers, etc.) or control requests 350 (IME change, mode change, etc.). Control requests 350 may directly invoke another IME through IME selection 360, which switches active IME 370 to a different IME, such as IME 500 shown in FIG. 5. FIG. 4 shows an example of movement conversion table 345, which corresponds to the example shown in FIG. 2 and includes examples of control requests 350 corresponding to thumb movement patterns in rows 490.

Figure 5:
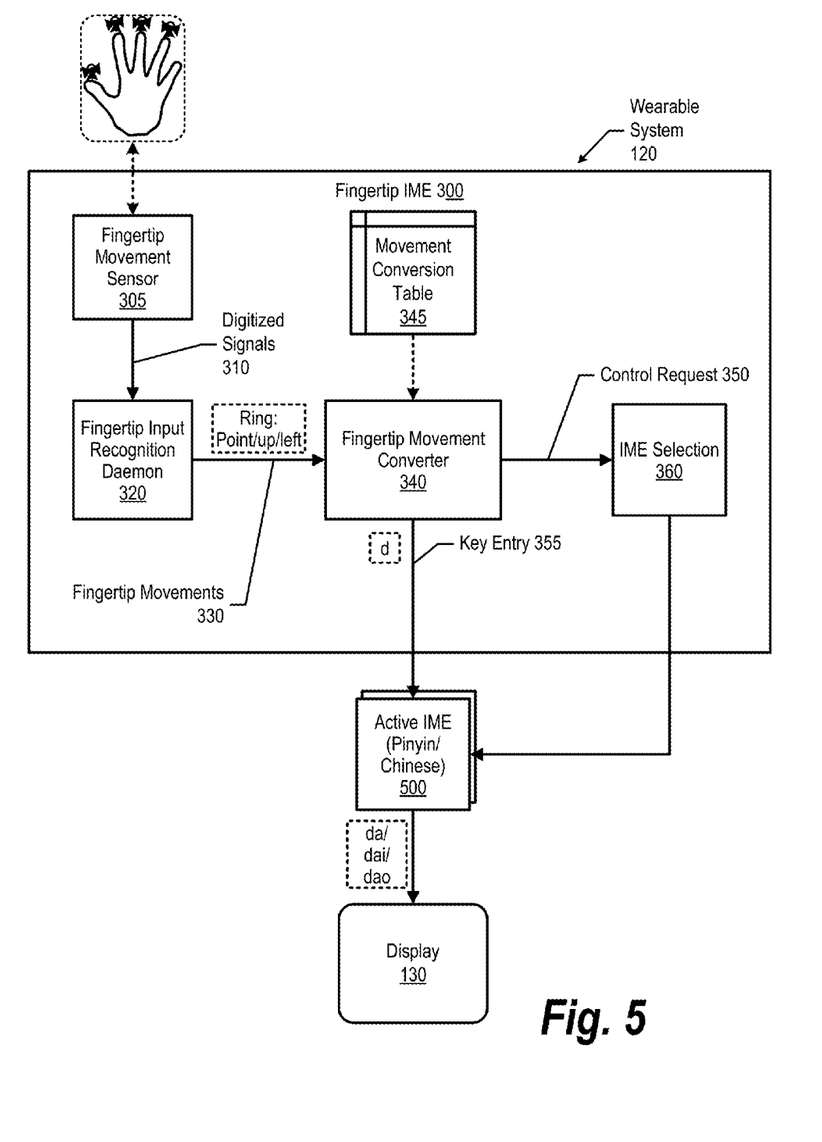
FIG. 5 is a high level diagram similar to that shown in FIG. 3 with the exception of wearable system 120 using a different active IME.

When fingertip movement converter 340 determines a key entry conversion, fingertip movement converter 340 sends key entry 355 to active IME 370. FIG. 3 shows that fingertip movement converter 340 converted fingertip movements 330 to the letter "D" based on movement conversion table 345. Active IME 370 processes key entry 355 and displays information on display 130 accordingly. The example in FIG. 3 shows that active IME 370 is a Latin IME and, as such, passes "D" to display 130. FIG. 5 shows an example when the active IME is a Pinyin/Chinese IME, which receives the letter "D" and displays correlated Chinese character candidates accordingly.

FIG. 4 is an exemplary diagram depicting a table that maps fingertip movements to particular key entries or control requests. Movement conversion table 345 maps fingertip movement patterns 405 to key entries, IME selections, and mode selections 410 based upon which finger/thumb and corresponding fingertip movement.

Rows 415, 440, and 470 show middle finger movements mapped to specific characters, which correspond to middle finger movements 250 shown in FIG. 2. Rows 430 and 460 show index finger movements mapped to specific characters, which correspond to index finger movements 240 shown in FIG. 2. Rows 420, 450, and 480 show ring finger movements mapped to specific characters, which correspond to ring finger movements 260 shown in FIG. 2.

Rows 490 show thumb finger movements mapped to specific IME selection control requests and mode selection control requests. For example, a user may point the user's thumb to switch IME's to a Romaji IME, or point the user's thumb and move the thumb right to switch to a Digital input mode (e.g., 0-9, #, $, etc.).

FIG. 5 is a high level diagram similar to that shown in FIG. 3 with the exception of wearable system 120 using a different active IME. User 100 may have moved the user's thumb to switch the active IME from a Latin IME to Pinyin/Chinese IME 500. FIG. 5 shows that when active IME 500 receives key entry 355 of "d," active IME 500 searches all Chinese characters whose pronunciation starts with "d", such as da, dai, dao, and displays the options on display 130. Active IME 500 then waits for more input from fingertip movement converter 340 to refine the options (see FIG. 7 and corresponding text for further details).

Figure 6:
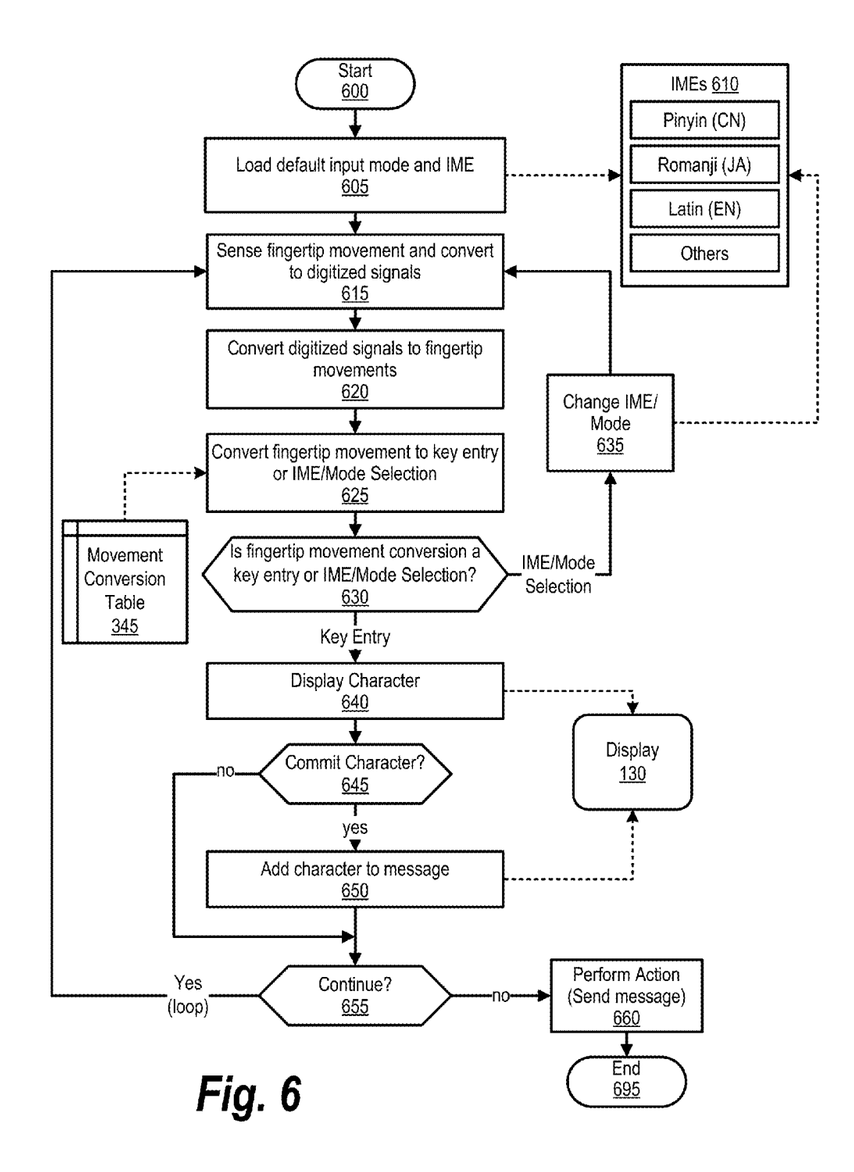
FIG. 6 is a flowchart showing steps taken to detect fingertip movements and convert the fingertip movements to key entries and control requests.

FIG. 6 is a flowchart showing steps taken to detect fingertip movements and convert the fingertip movements to key entries and control requests. FIG. 6 processing commences at 600 whereupon, at step 605, the process loads a default input mode and IME, such as loading a Latin IME in an upper case mode.

At step 615, the process senses fingertip movements by a user and converts the fingertip movements to digitized signals. As discussed earlier, the fingertip movements may be from a thumb, index finger, middle finger, ring finger, or pinky finger. At step 620, the process converts the digitized signals to fingertip movements, such as "INDEX FINGER: POINT, DOWN."

At step 625, the process converts the fingertip movements to a key entry or a control request based on movement conversion table 345, such as an IME selection or a mode selection. For example, if the identified fingertip movement is "INDEX FINGER: POINT, DOWN," the process converts the fingertip movement to "Q" (see FIGS. 2, 4, and corresponding text for further details).

The process determines as to whether the fingertip movement conversion is a key entry or a control request (decision 630). For example, the process may determine that the identified fingertip movement may from a thumb that is "point, left, down," which corresponds to switching to lower case per movement conversion table 345 shown in FIG. 4. If the fingertip movement conversion corresponds to a control action, then decision 630 branches to the "IME/Mode Selection" branch, which loops back to change the input mode or change the IME to one of IMEs 610 (step 635) and continue processing fingertip movements.

On the other hand, if the fingertip movement conversion is a key entry, decision 630 branches to the "Key Entry" branch. At step 640, the process displays a character on display 130 based on the active IME, such as the letter "K." The process determines as to whether to commit the character, such as committing the character to a message (decision 645). For example, the process may wait an amount of time, such as 1 second, before committing the character to allow the user a chance to remove the character, such as by performing a "backspace" fingertip movement or shaking a display attached to the user's wrist. In another example, the active IME may be a Pinyin/Chinese IME and not commit the characters until a certain amount of characters are determined.

If the process should commit the character, then decision 645 branches to the 'yes' branch. At step 650, the process commits the character, such as by adding the character to a message. On the other hand, if the process should not commit the character, then decision 645 branches to the 'no' branch and bypasses step 650.

The process determines as to whether to continue (decision 655). If the process should continue, then decision 655 branches to the 'yes' branch which loops back to sense more fingertip movements. This looping continues until the process should terminate, at which point decision 655 branches to the 'no' branch exiting the loop. At step 660, the process performs an action, such as sending a message or accessing a website based on the information that is displayed on display 130. FIG. 6 processing thereafter ends at 695.

Figure 7:
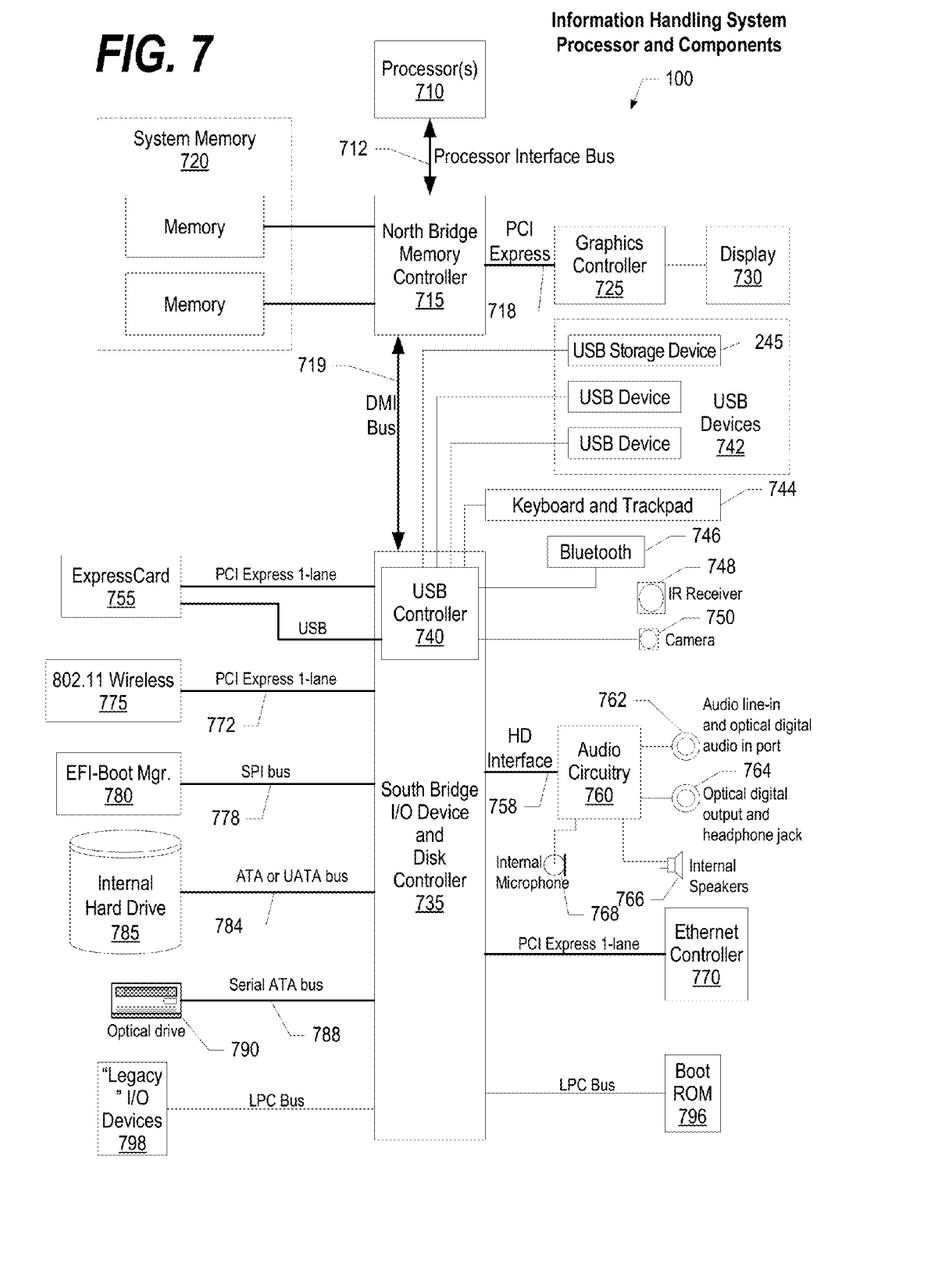
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus.

Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   creating a movement conversion table that comprises a plurality of table entries, wherein a first set of the plurality of table entries matches a plurality of fingertip movement patterns to a plurality of alpha-numeric characters, and wherein a second set of the plurality of table entries matches a plurality of thumb movement patterns to a plurality of actions selected from the group consisting of an input method editor (IME) change and a mode change;
   detecting, by at least one of the processors, one or more fingertip movements of a user, wherein the one or more fingertip movements are based on an imaginary grid that is devoid of a physical property or a virtual property;
   converting at least one of the one or more fingertip movements to a key entry based upon at least one of the plurality of table entries comprised in the movement conversion table; and
   displaying at least one character corresponding to the key entry on a display.

2. The method of claim 1 wherein the imaginary grid is a JiuGongGe (JGG) 3×3 grid, the method further comprising:
   defining the plurality of fingertip movement patterns corresponding to the JGG 3×3 grid.

3. The method of claim 1 further comprising:
   detecting a subsequent fingertip movement;
   determining that the subsequent fingertip movement corresponds to a selected one of the plurality of thumb movement patterns; and
   changing an active IME of the information handling system in response to determining that the selected thumb movement pattern corresponds to the IME change.

4. The method of claim 3 further comprising:
   changing to a digit input mode in response to determining that the selected thumb movement corresponds to the mode change.

5. The method of claim 3 wherein the active IME is changed to a Pinyin/Chinese IME, the method further comprising:
   detecting a new fingertip movement from the user;
   converting the new fingertip movement to a new key entry; and
   displaying one or more correlated Chinese character candidates based up upon the new key entry.

6. The method of claim 3 wherein the active IME is changed to a Romani/Japanese IME, the method further comprising:
   detecting a new fingertip movement from the user;
   converting the new fingertip movement to a new key entry; and
   displaying one or more correlated Japanese character candidates based up upon the new key entry.

7. The method of claim 2 further comprising:
   converting the at least one or more fingertip movements to one or more digitized signals;
   converting the one or more digitized signals to a selected one of the plurality of fingertip movement patterns; and
   using the movement conversion table to match the selected fingertip movement pattern to a selected one of the plurality of alpha-numeric characters.

8. The method of claim 1 wherein the information handling system is a wearable computing device.

9. An information handling system comprising:
   one or more processors;
   a memory coupled to at least one of the processors; and
   a set of computer program instructions stored in the memory and executed by at least one of the processors in order to perform actions of:
      creating a movement conversion table that comprises a plurality of table entries, wherein a first set of the plurality of table entries matches a plurality of fingertip movement patterns to a plurality of alpha-numeric characters, and wherein a second set of the plurality of table entries matches a plurality of thumb movement patterns to a plurality of actions selected from the group consisting of an input method editor (IME) change and a mode change;
      detecting, by at least one of the processors, one or more fingertip movements of a user, wherein the one or more fingertip movements are based on an imaginary grid that is devoid of a physical property or a virtual property;
      converting at least one of the one or more fingertip movements to a key entry based upon at least one of the plurality of table entries comprised in the movement conversion table; and
      displaying at least one character corresponding to the key entry on a display.

10. The information handling system of claim 9 wherein:
the information handling system is a wearable computing device.

11. The information handling system of claim 10 wherein the imaginary grid is a JiuGongGe (JGG) 3×3 grid, and wherein at least one of the one or more processors perform additional actions comprising:
defining the plurality of fingertip movement patterns corresponding to the JGG 3×3 grid.

12. The information handling system of claim 9 wherein at least one of the one or more processors perform additional actions comprising:
detecting a subsequent fingertip movement;
determining that the subsequent fingertip movement corresponds to a selected one of the plurality of thumb movement patterns;
changing an active IME of the information handling system in response to determining that the selected thumb movement pattern corresponds to the IME change; and
changing to a digit input mode in response to determining that the selected thumb movement corresponds to the mode change.

13. The information handling system of claim 11 wherein the active IME is changed to a Pinyin/Chinese IME, and wherein at least one of the one or more processors perform additional actions comprising:
detecting a new fingertip movement from the user;
converting the new fingertip movement to a new key entry; and
displaying one or more correlated Chinese character candidates based up upon the new key entry.

14. A computer program product stored in a computer readable storage medium, comprising computer program code that, when executed by an information handling system, causes the information handling system to perform actions comprising:
creating a movement conversion table that comprises a plurality of table entries, wherein a first set of the plurality of table entries matches a plurality of fingertip movement patterns to a plurality of alpha-numeric characters, and wherein a second set of the plurality of table entries matches a plurality of thumb movement patterns to a plurality of actions selected from the group consisting of an input method editor (IME) change and a mode change;
detecting, by at least one of the processors, one or more fingertip movements of a user, wherein the one or more fingertip movements are based on an imaginary grid that is devoid of a physical property or a virtual property;
converting at least one of the one or more fingertip movements to a key entry based upon at least one of the plurality of table entries comprised in the movement conversion table; and
displaying at least one character corresponding to the key entry on a display.

15. The computer program product of claim 9 wherein:
the information handling system is a wearable computing device.

16. The computer program product of claim 15 wherein the imaginary grid is a JiuGongGe (JGG) 3×3 grid, and wherein the information handling system performs additional actions comprising:
defining the plurality of fingertip movement patterns corresponding to the JGG 3×3 grid.

17. The computer program product of claim 14 wherein the information handling system performs additional actions comprising:
detecting a subsequent fingertip movement;
determining that the subsequent fingertip movement corresponds to a selected one of the plurality of thumb movement patterns;
changing an active IME of the information handling system in response to determining that the selected thumb movement pattern corresponds to the IME change; and
changing to a digit input mode in response to determining that the selected thumb movement corresponds to the mode change.

18. The computer program product of claim 16 wherein the active IME is changed to a Pinyin/Chinese IME, and wherein the information handling system performs additional actions comprising:
detecting a new fingertip movement from the user;
converting the new fingertip movement to a new key entry; and
displaying one or more correlated Chinese character candidates based up upon the new key entry.

* * * * *